(12) United States Patent
Roesler et al.

(10) Patent No.: US 7,057,000 B2
(45) Date of Patent: Jun. 6, 2006

(54) TWO-COMPONENT COATING COMPOSITIONS CONTAINING SILANE ADHESION PROMOTERS

(75) Inventors: Richard R. Roesler, Wexford, PA (US); P. Richard Hergenrother, Gibsonia, PA (US)

(73) Assignee: Bayer Materialscience LLC, Pittsburgh, PA (US)

( * ) Notice: Subject to any disclaimer, the term of this patent is extended or adjusted under 35 U.S.C. 154(b) by 0 days.

(21) Appl. No.: 10/217,923

(22) Filed: Aug. 13, 2002

(65) Prior Publication Data

US 2003/0039846 A1    Feb. 27, 2003

Related U.S. Application Data

(63) Continuation-in-part of application No. 09/747,057, filed on Dec. 22, 2000, now abandoned.

(51) Int. Cl.
   *C08L 77/04*    (2006.01)

(52) U.S. Cl. .......................................... 528/28; 528/29

(58) Field of Classification Search .................. 528/28; 508/28, 29
    See application file for complete search history.

(56) References Cited

U.S. PATENT DOCUMENTS

| | | | | |
|---|---|---|---|---|
| 4,206,299 A | * | 6/1980 | Yamazaki et al. | 528/288 |
| 4,289,672 A | * | 9/1981 | Friederich et al. | 524/114 |
| 4,507,447 A | * | 3/1985 | Yamazaki et al. | 525/528 |
| 4,983,643 A | * | 1/1991 | Sanna, Jr. | 521/159 |
| 5,908,948 A | | 6/1999 | Roesler et al. | 556/421 |
| 5,962,618 A | * | 10/1999 | Primeaux et al. | 528/61 |

FOREIGN PATENT DOCUMENTS

| | | | |
|---|---|---|---|
| EP | 0 175 447 | | 3/1986 |
| EP | 175 447 | * | 3/1996 |
| JP | 06 193792 A | | 7/1994 |

OTHER PUBLICATIONS

OSI Specialties, (date unavailable) Silquest Silanes, pp. 1–8.

* cited by examiner

*Primary Examiner*—Margaret G. Moore
(74) *Attorney, Agent, or Firm*—Joseph C. Gil; Thomas W. Roy

(57) ABSTRACT

The present invention relates to two-component coating compositions containing
a) a polyisocyanate component,
b) an isocyanate-reactive component that contains less than 3% by weight, based on the weight of component b), of an aromatic polyamine and
c) 0.1 to 1.8 wt. %, based on the weight of components a) and b), of a compound containing at least one epoxy group and at least one alkoxysilane group.

The present invention also relates to substrates coated with these coating compositions, in particular metal substrates.

14 Claims, No Drawings

TWO-COMPONENT COATING COMPOSITIONS CONTAINING SILANE ADHESION PROMOTERS

This is a Continuation-In-Part application of U.S. Ser. No. 09/747,057, filed Dec. 22, 2000 now abandoned.

BACKGROUND OF THE INVENTION

1. Field of the Invention

The present invention relates to two-component coating compositions containing silane adhesion promoters having epoxy groups and alkoxysilane groups and to their use for preparing coatings having improved adhesion, especially wet adhesion.

2. Description of the Prior Art

Two-component coating compositions containing a polyisocyanate component and an isocyanate-reactive component, preferably a polyhydroxyl compound, are known and can be used to coat a variety of substrates. One of the deficiencies of these coatings is that they do not possess adequate wet adhesion, which is a critical requirement for coatings used underground, e.g., as coatings for oil and gas transmission pipelines.

Coatings previously used for this application have suffered from other problems. Asphaltic coatings are biodegradable and not suitable for long term (20 to 50 years) use. Coal tar coatings are not used because of toxicity. Liquid epoxy coatings require application temperatures of >55° C. and cure too slowly for production use in the field. Polyolefin coatings do not maintain adhesion under cathodic protection.

High performance coatings are needed. Known polyurethane coatings have the ability to be rapidly cured, but do not have the wet adhesion necessary for this application.

Accordingly, it is an object of the present invention to provide coating compositions that are suitable for preparing coatings having improved adhesion, especially wet adhesion.

This object may be achieved with the two-component coating compositions according to the present invention which contain compounds containing epoxy and alkoxysilane groups as adhesion promoters.

The use of silanes as adhesion promoters has been suggested. A product information bulletin from OSi Specialties discloses the use of several silane compounds as adhesion promotors for various coating resins, including polyurethanes. However, as shown by the comparison examples of the present application, most of the disclosed silane compounds were not very effective for improving the adhesion, especially the wet adhesion, of two-component polyurethane coating compositions. Accordingly, it is apparent that the reference to polyurethanes was a reference to one-component, fully reacted polyurethanes.

SUMMARY OF THE INVENTION

The present invention relates to two-component coating compositions containing a) a polyisocyanate component, b) an isocyanate-reactive component that contains less than 3% by weight, based on the weight of component b), of an aromatic polyamine and c) 0.1 to 1.8 wt. %, based on the weight of components a) and b), of a compound containing at least one epoxy group and at least one alkoxysilane group.

The present invention also relates to substrates coated with these coating compositions, in particular metal substrates.

DETAILED DESCRIPTION OF THE INVENTION

Preferred compounds containing epoxy groups and alkoxysilane groups that are used as component c) in the compositions according to the present invention correspond to the following formula

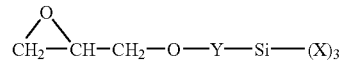

wherein

X represents identical or different organic groups which are inert to isocyanate groups below 100° C., provided that at least one of these groups is an alkoxy group, preferably alkyl or alkoxy groups having 1 to 4 carbon atoms and more preferably alkoxy groups, and Y represents a linear or branched alkylene group containing 1 to 8 carbon atoms, preferably a linear group containing 2 to 4 carbon atoms or a branched group containing 5 to 6 carbon atoms, more preferably a linear group containing 3 carbon atoms.

Especially preferred are compounds in which X represents methoxy, ethoxy groups or propoxy groups, more preferably methoxy or ethoxy groups and most preferably methoxy groups, and Y is a propylene group.

Examples of suitable compounds containing epoxy groups and alkoxysilane groups include 2-glycidoxyethyl-dimethylmethoxysilane; 6-glycidoxyhexyl-tributoxysilane; 3-glycidoxypropyl-trimethoxysilane; 3-glycidoxypropyl-triethoxysilane; 3-glycidoxypropyl-methyldimethoxysilane; 5-glycidoxypentyl-trimethoxysilane; 5-glycidoxypentyl-triethoxysilane and 3-glycidoxypropyl-triisopropoxysilane. Especially preferred is 3-glycidoxypropyl-trimethoxysilane, which is available from OSi Specialties as Silquest A-187.

Suitable polyisocyanates for use as component a) in the compositions of the present invention are selected from monomeric polyisocyanates, polyisocyanate adducts and NCO prepolymers, preferably polyisocyanate adducts and NCO prepolymers and more preferably NCO prepolymers. The polyisocyanates have an average functionality of 1.8 to 6, preferably 2 to 6 and more preferably 2 to 4.

Suitable monomeric diisocyanates are represented by the formula

in which R represents an organic group obtained by removing the isocyanate groups from an organic diisocyanate having a molecular weight of about 112 to 1,000, preferably about 140 to 400. Diisocyanates preferred for the process according to the invention are those in which R represents a divalent aliphatic hydrocarbon group having 4 to 40, preferably 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4-and/or 4,4'-diphenyl-methane diisocyanate, 1,5-diisocyanato naphthalene and mixtures thereof.

Polyisocyanates containing 3 or more isocyanate groups such as 4-isocyanantomethyl-1,8-octamethylene diisocyanate and aromatic polyisocyanates such as 4,4',4"-triphenyl-methane triisocyanate and polyphenyl polymethylene polyisocyanates obtained by phosgenating aniline/formaldehyde condensates may also be used.

Preferred organic diisocyanates include 1,6-hexamethylene diisocyanate, 1-isocyanato-3-isocyanatomethyl-3,5,5-trimethyl-cyclohexane (isophorone diisocyanate or IPDI), bis-(4-isocyanato-cyclohexyl)-methane, 1-isocyanato-1-methyl-4(3)-isocyanatomethyl cyclohexane, 2,4- and/or 2,6-toluylene diisocyanate, and 2,4- and/or 4,4'-diphenyl-methane diisocyanate.

Suitable polyisocyanate adducts for use as component a) are those prepared from the preceding monomeric polyisocyanates and containing isocyanurate, uretdione, biuret, urethane, allophanate, iminooxadiazine dione, carbodiimide and/or oxadiazinetrione groups. The polyisocyanates adducts, which preferably have an NCO content of 5 to 30% by weight, include:

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g, a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to mono-allophanate groups of about 10:1 to 1:10, preferably about 5:1 to 1:7.

7) Iminooxadiazine dione and optionally isocyanurate group-containing polyisocyanates which may be prepared in the presence of special fluorine-containing catalysts as described in DE-A 19611849. These polyisocyanates generally have an average NCO functionality of 3 to 3.5 and an NCO content of 5 to 30%, preferably 10 to 25% and most preferably 15 to 25% by weight.

8) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

9) Polyisocyanates containing oxadiazinetrione groups and containing the reaction product of two moles of a diisocyanate and one mole of carbon dioxide.

Preferred polyisocyanate adducts are the polyisocyanates containing isocyanurate, uretdione, biuret, iminooxadiazine dione and/or allophanate groups.

The NCO prepolymers, which may also be used as polyisocyanate component a), are prepared from the previously described monomeric polyisocyanates or polyisocyanate adducts, preferably monomeric diisocyanates, and polyhydroxyl compounds containing at least two hydroxyl groups. These polyhydroxyl compounds include high molecular weight compounds having molecular weights of 500 to about 10,000, preferably 800 to about 8,000, and more preferably 1800 to 8,000, and optionally low molecular weight compounds having molecular weights below 500. The molecular weights are number average molecular weights ($M_n$) and are determined by end group analysis (OH number). Products obtained by reacting polyisocyanates exclusively with low molecular weight compounds are polyisocyanates adducts containing urethane groups and are not considered to be NCO prepolymers.

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyether polyols, polyester polyols and polycarbonate polyols are preferred. Especially preferred are the polyether polyols.

Examples of suitable high molecular weight polyhydroxyl compounds include polyether polyols, which may be obtained in known manner by the alkoxylation of suitable starter molecules. Examples of suitable starter molecules include polyols, water, organic polyamines having at least two N—H bonds and mixtures thereof. Suitable alkylene oxides for the alkoxylation reaction are preferably ethylene oxide and/or propylene oxide, which may be used in sequence or in admixture.

Also suitable for preparing the prepolymers are polyester polyols prepared from low molecular weight alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Polylactones having hydroxyl groups, particularly poly-,-caprolactone, are also suitable for producing the prepolymers.

Other suitable polyols include polycarbonates having hydroxyl groups, which may be produced by the reaction of diols with phosgene or diaryl carbonates such as diphenyl carbonate.

Further details concerning the low molecular weight compounds and the starting materials and methods for preparing the high molecular weight polyhydroxy compounds are disclosed in U.S. Pat. No. 4,701,480, herein incorporated by reference.

These NCO prepolymers preferably have an isocyanate content of 0.3 to 35% by weight, more preferably 0.6 to 25% by weight and most preferably 1.2 to 20% by weight. The NCO prepolymers are produced by reacting the diisocyanates with the polyol component at a temperature of 40 to 120EC, preferably 50 to 100EC, at an NCO/OH equivalent ratio of 1.3:1 to 20:1, preferably 1.4:1 to 10:1. If chain extension via urethane groups is desired during the preparation of the isocyanate prepolymers, an NCO/OH equivalent ratio of 1.3:1 to 2:1 is selected. If chain extension is not desired, an excess of diisocyanate is preferably used, corresponding to an NCO/OH equivalent ratio of 4:1 to 20:1, preferably 5:1 to 10:1. The excess diisocyanate may optionally be removed by thin layer distillation when the reaction is completed. In accordance with the present invention NCO prepolymers also include NCO semi-prepolymers which contain unreacted starting polyisocyanates in addition to the urethane group-containing prepolymers.

Suitable isocyanate-reactive components for use as component b) in the compositions of the present invention are the high and low molecular weight, polyols previously disclosed for preparing the NCO prepolymers, provided that component b) contains less than 3% by weight, preferably less than 2% by weight, more preferably less than 1% by weight and most preferably less than 0.5% by weight, based on the weight of component b), of aromatic polyamines, in particular sterically hindered aromatic polyamines. Also suitable are the known high molecular weight amine-functional compounds, which may be prepared by converting the terminal hydroxy groups of the polyols previously described to amino groups, and the high molecular weight polyaldimines disclosed in U.S. Pat. No. 5,466,771, herein incorporated by reference. The high molecular weight polyols are preferred.

The two-component coating compositions of the present invention may be prepared by mixing the individual components. Components a) and b) are present in an amount of sufficient to provide an equivalent ratio of isocyanate groups is isocyanate-reactive, preferably hydroxyl groups of 0.8:1 to 1.2:1, preferably 0.9:1 to 1.1:1 and more preferably 1:1 to 1.1:1. Component c) is present in an amount of at least 0.1%, preferably at least 0.3% and more preferably 0.5%, based on the weight of components a) and b). The upper limit for the amount of component c) is 1.8%, preferably 1.5% and more preferably 1.3%, based on the weight of components a) and b).

The two-component compositions generally may be either solvent-free or contain up to 70%, preferably up to 60% organic solvents, based on the weight of components a) and b). Suitable organic solvents include those which are known from polyurethane chemistry.

The compositions may also contain known additives, such as catalysts, leveling agents, wetting agents, flow control agents, antiskinning agents, antifoaming agents, fillers (such as silica, aluminum silicates and high-boiling waxes), viscosity regulators, plasticizers, pigments, dyes, UV absorbers and stabilizers against thermal and oxidative degradation.

The two-component compositions may be applied to any desired substrates, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented.

The two-component compositions are especially suitable for coating substrates, preferably metal substrates such as pipes, which will be exposed to a wet environment.

The two-component compositions may be cured at ambient temperature or at elevated temperatures, preferably at ambient temperatures.

The invention is further illustrated but is not intended to be limited by the following examples in which all parts and percentages are by weight unless otherwise specified.

EXAMPLES

Polyisocyanate 1

556 g of a distilled diphenylmethanediisocyanate (MDI) composition containing 65% 2,4'-MDI and 35% 4,4'-MDI were stirred at 60° C. Then a mixture of 222 g of a polyether diol made by propoxylation of propylene glycol (OH number 112) and 222 g of a tetrafunctional polyether made by propoxylation of ethylene diamine (OH number 60) was added dropwise, so that a maximum temperature of 65° C. was maintained. When an NCO content of 16% was reached, the prepolymer was diluted with 1000 g of a crude MDI containing 40.5% 2,4-MDI, 49,5% 4,4'-MDI and 10% polymeric MDI. The final semi-prepolymer had an NCO content of 24% and a viscosity of 220 mPa.s at 23° C.

Polyether Polyol 1

A polypropylene oxide polyol having a functionality of 3, an OH number of 370 and an equivalent weight of 152 and initiated with trimethylolpropane.

Polyether Polyol 2

A polypropylene oxide polyol initiated with glycerine, tipped with ethylene oxide (PO:EO equivalent ratio 83:17), having a functionality of 3, an OH number of 35 and an equivalent weight of 1600 and containing 20% of the equimolar reaction product toluene diisocyanate and hydrazine (overall OH number 28).

Two-Component Coating Compositions

Two-component coating compositions were prepared from the following ingredients:

| | Parts |
|---|---|
| Component I | |
| Polyether polyol 1 | 120 |
| Polyether polyol 2 | 60 |
| 1,4-butane diol | 130 |
| 3,5-diethyl-toluene diamine | 5 |
| Talc | 125 |
| Lamilar silicate[1] | 70 |
| Titanium dioxide | 30 |

-continued

| | Parts |
|---|---|
| 1:1 Blend of molecular sieve/caster oil[2] | 50 |
| Dibutyltin dilaurate | 0.4 |
| Silicone flow aid | 0.2 |
| Component II | |
| Polyisocyanate 1 | 490 |
| Silane additive | See Table |
| Black paste | 5 |

[1]Novacite 207 (available from Malvern)
[2]Baylith L paste (available from Bayer)

Two-component coating compositions were prepared from the preceding ingredients and the amounts and types of the silane additives set forth in the following tables. The compositions were applied at 20–30 mils on hot-rolled, sand-blasted steel panels. The panels were cured at room temperature for two weeks.

To determine dry and wet adhesion the coated panels were placed on end in a container or water such that about two thirds of the coating was submerged. After 30 days the panel was removed and immediately tested. The test was conducted by scribing an "X" on both the dry and wet areas of the panel. A knife was used to pick at the corners of the "X." A rating scale of 1 to 10 was used as follows:

1—no adhesion, coating falls off of panel
5—moderate adhesion, but coating can be peeled off of panel
7—strong adhesion, but coating can be peeled off of panel
8—coating tears as it is peeled off of panel
10—coating can only be cut off of panel A rating of 7 is acceptable, a rating of 8 is a good result and a rating of 10 is an excellent result. A rating of 6 or less is unacceptable for use as a pipeline coating.

TABLE

| | | Adhesion | |
|---|---|---|---|
| Adhesion Promoter | Amount (wt. %) | Dry | Wet |
| None (Comp.) | 0 | 2 | 2 |
| 3-glycidoxypropyl-trimethoxysilane[3] | 1 | 10 | 10 |
| According to the invention | | | |
| 3-isocyanatopropyltriethoxysilane[4] (Comp.) | 1 | 7 | 7 |
| Tris-[3-(trimethoxysilyl)propyl]isocyanurate[5] (Comp.) | 1 | 8 | 8 |
| 3-mercaptopropyl-trimethoxysilane[6] (Comp.) | 1 | 3 | 3 |
| 3-aminopropyl-trimethoxysilane[7] (Comp.) | 1 | 3 | 6 |
| N-(2-aminoethyl)-3-aminopropyl-trimethoxysilane[8] (Comp.) | 1 | 2 | 2 |
| Triaminofunctionalsilane[9] (Comp.) | 1 | 3 | 3 |
| 3-ureidopropyl-trialkoxysilane[10] (Comp.) | 1 | 3 | 3 |
| Bis-(3-trimethoxysilylpropyl)amine[11] (Comp.) | 1 | 3 | 3 |
| Silquest Wet Link 78 additive (Comp.) | 1 | 4 | 5 |

[3]Silquest A-187
[4]Silquest A-1310
[5]Silquest Y-11597
[6]Silquest A-189
[7]Silquest A-1110
[8]Silquest A-1120
[9]Silquest A-1130
[10]Silquest A-1160
[11]Silquest A-1170

The examples demonstrate that it is possible using the adhesion promoters according to the invention containing epoxy and alkoxysilane groups to provide excellent adhesion, especially wet adhesion. This degree of adhesion cannot be provided by other known silane adhesion promoters when used in similar amounts.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two-component coating composition consisting of
    a) a polyisocyanate component comprising NCO prepolymers produced by reacting one or more isocyanates with a polyether component at a NCO/OH equivalent ratio of 1.3:1 to 20:1,
    b) an isocyanate-reactive component selected from the group consisting of low and high molecular weight polyols, high molecular weight amine-functional compounds and high molecular weight polyaldimines that contain less than 0.5% by weight, based on the weight of component b), of an aromatic polyamine,
    c) 0.1 to 1.8 wt. %, based on the weight of components a) and b), of a compound containing at least one epoxy group and at least one alkoxysilane group, wherein a first component comprises a) and c) and a second component comprises b) and
    d) optionally one or more additives selected from the group consisting of solvents, catalysts, leveling agents, wetting agents, flow control agents, antiskinning agents, antifoaming agents, fillers, viscosity regulators, plasticizers, pigments, dyes, UV absorbers, stabilizers against thermal and oxidative degradation, and combinations thereof.

2. The composition of claim 1 wherein the compound containing epoxy groups and alkoxysilane groups that are used as component c) in the compositions according to the present invention correspond to the following formula

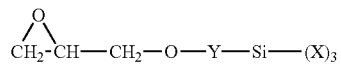

wherein
    X represents identical or different organic groups which are inert to isocyanate groups below 100° C., provided that at least one of these groups is an alkoxy group, and
    Y represents a linear or branched alkylene group containing 1 to 8 carbon atoms.

3. The composition of claim 2 wherein
    X represents identical or different alkyl or alkoxy groups, provided that at least one of these groups is an alkoxy group, and
    Y represents a linear or branched alkylene group containing 2 to 4 carbon atoms.

4. The composition of claim 2
    X represents identical or different alkoxy groups and
    Y represents a linear alkylene group containing 3 carbon atoms.

5. The composition of claim 1 wherein component c) is present in an amount of 0.5 to 1.5 wt. %, based on the weight of components a) and b).

6. The composition of claim 2 wherein component c) is present in an amount of 0.5 to 1.5 wt. %, based on the weight of components a) and b).

7. The composition of claim 3 wherein component c) is present in an amount of 0.5 to 1.5 wt. %, based on the weight of components a) and b).

8. The composition of claim 4 wherein component c) is present in an amount of 0.5 to 1.5 wt. %, based on the weight of components a) and b).

9. The composition of claim 1 wherein polyisocyanate component a) comprises an NCO prepolymer prepared from a polyisocyanate and a polyether polyol and component c) is present in an amount of 0.5 to 1.5 wt. %, based on the weight of components a) and b).

10. The composition of claim 2 wherein polyisocyanate component a) comprises an NCO prepolymer prepared from a polyisocyanate and a polyether polyol and component c) is present in an amount of 0.5 to 1.5 wt. %, based on the weight of components a) and b).

11. The composition of claim 3 wherein polyisocyanate component a) comprises an NCO prepolymer prepared from a polyisocyanate and a polyether polyol and component c) is present in an amount of 0.5 to 1.5 wt. %, based on the weight of components a) and b).

12. The composition of claim 4 wherein polyisocyanate component a) comprises an NCO prepolymer prepared from a polyisocyanate and a polyether polyol and component c) is present in an amount of 0.5 to 1.5 wt. %, based on the weight of components a) and b).

13. A substrate coated with coating composition of claim 1.

14. A metal substrate coated with the coating composition of claim 1.

* * * * *